United States Patent
Potts, Jr. et al.

(10) Patent No.: US 6,662,209 B2
(45) Date of Patent: Dec. 9, 2003

(54) HIGH PERFORMANCE CLIENT/SERVER EDITOR

(75) Inventors: Richard W. Potts, Jr., Poughquag, NY (US); Colette A. Manoni, Brewster, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/334,179

(22) Filed: Dec. 30, 2002

(65) Prior Publication Data

US 2003/0115295 A1 Jun. 19, 2003

Related U.S. Application Data

(62) Division of application No. 09/376,902, filed on Aug. 18, 1999, now Pat. No. 6,516,339.

(51) Int. Cl.[7] ............................................... G06F 13/00
(52) U.S. Cl. ........................ 709/203; 709/217; 709/219
(58) Field of Search .............................. 709/200, 201, 709/203, 212, 213, 214, 216, 217, 218, 219, 227, 229

(56) References Cited

U.S. PATENT DOCUMENTS

| | | | | |
|---|---|---|---|---|
| 5,515,491 A | * | 5/1996 | Bates et al. | 395/155 |
| 5,732,219 A | | 3/1998 | Blumer et al. | 709/217 |
| 5,774,717 A | | 6/1998 | Porcaro | 707/202 |
| 5,799,150 A | | 8/1998 | Hamilton et al. | 709/203 |
| 5,809,248 A | | 9/1998 | Vidovic | 709/219 |
| 5,835,601 A | * | 11/1998 | Shimbo et al. | 707/203 |
| 6,085,228 A | | 7/2000 | Tharakan | 709/203 |
| 6,151,609 A | | 11/2000 | Truong | 707/505 |
| 6,192,389 B1 | | 2/2001 | Ault et al. | 709/101 |
| 6,202,199 B1 | | 3/2001 | Wygodny et al. | 714/4 |
| 6,411,965 B2 | * | 6/2002 | Klug | 707/201 |
| 6,489,954 B1 | * | 12/2002 | Powlette | 345/329 |

FOREIGN PATENT DOCUMENTS

| | | |
|---|---|---|
| JP | 9-198426 | 7/1997 |
| JP | 9-282212 | 10/1997 |

OTHER PUBLICATIONS

"Virtual Image Editing", IBM Technical Disclosure Bulletin, vol. 39, No. Aug. 8, 1996, pp. 93–96.

* cited by examiner

Primary Examiner—Moustafa M. Meky
(74) Attorney, Agent, or Firm—Scully, Scott, Murphy & Presser; William A. Kinnaman, Jr., Esq.

(57) ABSTRACT

A high performance client/server editor and method for editing documents with improved performance. A server listening for editing requests from a client to edit a file located with the server spawns a thread for each editing request to handle that particular request. A client receiving input commands from a user for editing requests spawns a thread for each editing request received, enabling more than one editing request to be processed simultaneously. When an edit feature is invoked, the client sends a request to the server to download the file. While the file is downloading from the server to the client location, the client displays the first page of the file to the user to enable the user to start editing the file before the entire file is downloaded. The client handles the user's edit commands for portions of the file downloaded. If the user attempts to edit portions of the file not yet downloaded, the client sends a request to the server to handle the edit at the server location and send a response back to the client for display to the user by the client. Edit changes are sent to the server when user enters a save command. Alternatively, edit changes are sent to the server when bandwidth is available. When the user exits without saving these changes, the server discards the changes. In subsequent edit invokes of the same file, the client and server cooperate to download only those portions of the file which were changed since the last download.

13 Claims, 3 Drawing Sheets

HIGH PERFORMANCE CLIENT/SERVER EDITOR

RELATED APPLICATIONS

This application is a divisional of U.S. application Ser. No. 09/376,902, filed Aug. 18, 1999, now U.S. Pat. No. 6,516,339.

TECHNICAL FIELD OF THE INVENTION

The present invention relates in general to a computer editing system for editing files and information, and more particularly to a multi-threaded client and server editor capable of handling a plurality of editing activities simultaneously for improving performance.

BACKGROUND OF THE INVENTION

Client/server computing defines an architecture for distributed processing between a client computer and a server computer. In a client/server computing model, instead of having the processing done entirely by a centralized system, e.g., a mainframe, a client computer shares some of the processing load. The client is an intelligent system able to perform its own processing and typically runs graphical user interfaces (GUIs) such as Windows programs and Web browsers. The client computer generally includes a desktop such as a PC and/or workstation. The server is typically a back-end system and includes a file server, print server, communications server, or any other system providing services. The server computer typically is a mainframe, or a midsize computer generally having more computing power than the client computers.

An example of client/server computing model is the World Wide Web (Web) on the Internet. A Web browser resident on a client computer communicates with a Web server which typically queries back-end systems and returns the results of the queries back to the client. The Web browser receives the results and presents the data in an appropriate form compatible for that particular client computer. In this Web client/server model, the applications are truly broken up into components, i.e., the Web browser and the Web server that run as services on different computers: a client computer and a server computer. An advantage of a client/server model is that multiple computers can perform functions in parallel simultaneously and cooperate to complete a task.

Although above described client/server computing is known widely, development work on a client/server platform, especially for mainframes is relatively new. Development work includes editing source files and/or information to perform a desired task. One conventional method of development on a client/server platform is to first retrieve the entire source file from a server or server library system maintaining the file by copying the entire file from the server system to the client; second, edit the file on the client; and third, copy the source back into the server or server library system. However, many disadvantages are associated with this conventional method. Typically, a client and server in a client/server model are connected remotely within one or more networks, such as a dial-up connection, LAN, WAN, and/or the Internet, and usually do not have a direct or dedicated line connection between them. When a client is connected to a server employing one or more of these network configurations, transferring data tends to take a large amount of time, often forcing a user at the client to wait before the user is able to begin a development or an editing session. This is especially true when downloading a large file. Moreover, if a downloading process terminates abnormally, e.g., due to a process failure without having completed the download, the user is forced to start the data transfer from the very beginning.

An alternative method, also commonly used by existing systems is to employ a terminal emulator such as the 3270 emulator on the client to edit the source file directly on the server remotely, without having the file transferred to the client. With this method, however, a user is limited to only those presentation abilities offered by a particular system and a terminal that is emulated, e.g., 3270 system.

Presently, the client/server development platform allows use of many advanced presentation abilities including the the graphics utilities of a workstation. Using a host emulator thus does not allow for the power and flexibility afforded by a client workstation. Therefore, it is highly desirable to be able to employ the state of the art modern workstation technology when developing or editing a source file located with the server. It is also highly desirable to have a client/server system which improves data transfer performance between the server and the client.

SUMMARY OF THE INVENTION

The present invention is directed to a high performance multi-threaded client/server editor and method for editing one or more remote files or information with improved performance. The files are typically stored on a storage media device accessible by a computer. The present invention includes an advantage of the speed, reliability and availability of a server and the powerful tools such as the presentation utilities of a client workstation. When an edit feature is invoked by a user at a client platform or workstation, the client component (client) of the high performance multi-threaded client/server editor of the present invention makes a request to the server component (server) to initiate downloading a file for editing. As the file is downloading from the server, the client displays the first page of the file to the user at a display terminal wherein the user is enabled to start editing the file even before the entire file is completely downloaded from the server. Other presentation methods for presenting the file via an appropriate presentation device to a user for editing may be utilized in another embodiment of the present invention.

When the user attempts to edit the portion of the file that has not yet been downloaded, the client sends the edit request to the server to handle and respond back to the client. The client then presents the response to the user. The user is therefore enabled to begin editing seamlessly as soon as the downloading is initiated, transparent to the fact that the entire file has not downloaded yet when the editing begins.

As editing of the file is in progress, the client sends the modified portions of the file to the server. The client sends the modified portions when the user selects to save the file wherein the server updates the file to include the modified portions. The modified portions are also sent by the client as the bandwidth on a connection between the client and the server becomes available. When the modified portions are sent based on the bandwidth availability, the server updates the file to include the modified portions only when a save command is received from the client.

This feature of sending modified portions when the bandwidth becomes available optimizes the network usage as well as improving performance. For example, if a user decides to save the file being edited by entering a "save" edit command when the network is tied up, the transfer of the modified file to the server must wait until the network is free to perform the transfer. The client process performing the save task may also be held up waiting for a reply from the server, creating a bottleneck. On the other hand, if the modified files were sent previously based on the network bandwidth availability, the file need not be transferred at the time of user's save command, eliminating a need to wait for the network to be free.

For subsequent edits of the same file, the client and server cooperate to download only those portions of the file which have been changed since the last time the file was downloaded to the client. This feature of downloading only the necessary portions of the file enables additional performance improvement as well as freeing the bandwidth of the communications connection for other usage by minimizing the amount of data sent over the network.

The features and advantages of the present invention are provided by having a client residing at a user platform including a workstation or a personal computer (PC) and a server residing with a remote computer. The files for editing are typically located with the server or near the server. The files however need not physically reside on a same system as the server. For example, the file may be resident on a system which is connected to and accessible by the server via a network. The client includes a file buffer to hold the file downloaded from the server and a display buffer for holding the contents of the file buffer which are displayed on a display terminal at the client platform.

In accordance with the present invention, when an edit feature is invoked initially, the client spawns a thread to communicate to the server to download a file and to receive the downloaded file into the file buffer. At the same time, the client spawns a second thread to transfer the contents of the file buffer into the display buffer and to present a page of the file on the display terminal. The user at the client platform then may start editing the file even as the remaining portions of the file continue to download from the server into the file buffer.

When the user attempts to edit portions of the file which have not yet been downloaded, the client spawns an additional thread to send this edit request to the server, where the editing may be performed. The additional thread waits for the response from the server and when received presents the results to the user.

Generally, thereafter, the client spawns a thread for each editing request to enable more than one editing request to be processed at one time. For example, if two editing requests, first to "save" and second to "go to a selected page" were requested, a first thread is created and performs the save function while the second thread created displays the selected page on the display terminal. If these two editing requests were entered within a short period of time or almost at the same time, the two threads would perform their respective tasks simultaneously. The user, thus need not wait until the first task is completed before the second task is attempted.

The server typically resides at a remote computer and is a daemon process waiting or listening for editing requests from the client. When an edit request is received, the server spawns a first server thread to handle the request. The server then returns to its listening mode for additional requests. While the first thread is downloading a file to the client, a second thread may be created to handle an editing request from the client, the editing request associated with portions of file which are not yet downloaded. The second thread performs the task associated with the editing request directly at the server and returns the response to the client. Generally, the server spawns a thread for each request received to enable multi-tasking functionality.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

Figure 1:
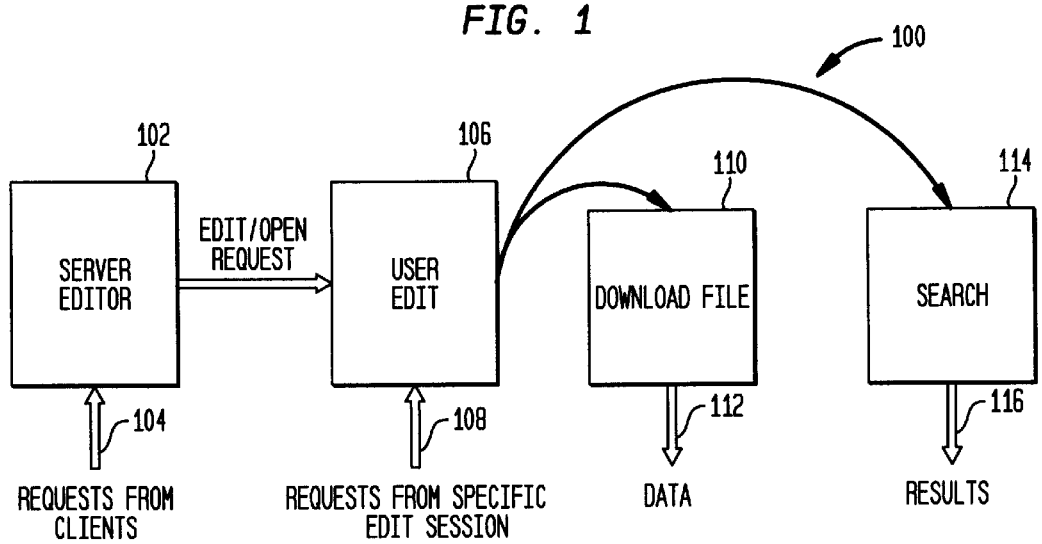
FIG. 1 is a diagram illustrating an example of the server component structure in the first embodiment of the present invention.

In the present invention, the terms "edit", "editing", "editing commands", and "editing requests" as used throughout the description and the claims describe any processing which may be performed on a file, including opening, browsing, and searching which may be done without actually modifying the file. FIG. 1 is a diagram illustrating an example of the server component structure in the first embodiment of the present invention. The server component (server) 102 is typically a daemon or background process started on a computer when an operating system is started. As known by the persons skilled in the technological art, the daemon or background processes generally run continuously in the background, performing particular tasks assigned to the processes while the computer is running. Likewise, the server 102 starts with the computer operating system and waits in "listen mode" for requests to edit a file located with the server. The files reside on a storage device typically located with the computer system running the server of the present invention. The files may also reside at a different location than the same computer system having the server.

When an edit request 104 is received from a client, a new processor thread 106 is created to handle the request.

For example, a "fork" call in C programming language to create a child process may be employed. The child process then is programmed to handle the request which upon finishing the task for the request "kills" itself by an "exit" call. As soon as the new thread 106 is created and while the new thread 106 is performing its editing task, the server daemon 102 continues to listen for next editing requests from the client. This feature allows multiple editing sessions involving different files to run concurrently.

In one embodiment of the invention, the new server thread 106 handles all requests associated with a particular edit session until the edit session is terminated by, for example, receiving an "exit" editor command from the client. In this embodiment, editing requests 108 associated with this edit session are received by the new server thread 106 directly from the client. For each editing request 108 received, the new server thread 106 spawns or generates another server thread to handle that particular request, the new server thread 106 continuing to listen for more requests associated with that edit session.

For example, as shown in FIG. 1, the new server thread 106 in response to an initial edit request generates a download thread 110 to initiate downloading 112 of a file for editing to the client. While the download thread 110 is performing its task of transferring 112 data in the file to the client, the new server thread 106 may receive a second editing request associated with this editing session. This editing request for example may be a search request to search for all occurrences of one or more words in the file. This search request may be transmitted by the client if, for example, the client does not have the entire file downloaded from the server at the time a user invokes the search request. In response the new server thread 106 generates a search thread 114 to access the file on the server and perform the search on the portions of the file which have not yet been downloaded. The results of the search are transmitted as shown at 116 to the client directly by the search thread 114. The results may include pages of the file which have not yet been downloaded by the download thread 110. In one embodiment of the present invention, the search thread 114 may notify the download thread 110 to skip downloading those pages which the search thread 114 has already downloaded as a result of a search task.

Generally, in the first embodiment, the server 102 generates a new server thread 106 for each edit session; and the new server thread 106 generates an additional thread to handle each edit request received for the edit session. When an "exit" request is received from the client, the new server thread 106 exits itself, cleaning up the additional threads that the new server thread 106 generated. The server 102 continues to listen for requests from the client to open another editing session, upon receiving of which the process described herein above is repeated. It should be understood that the server 102 may generate multiple new server threads 106 as more than one edit session requests are received from the client.

Figure 2:
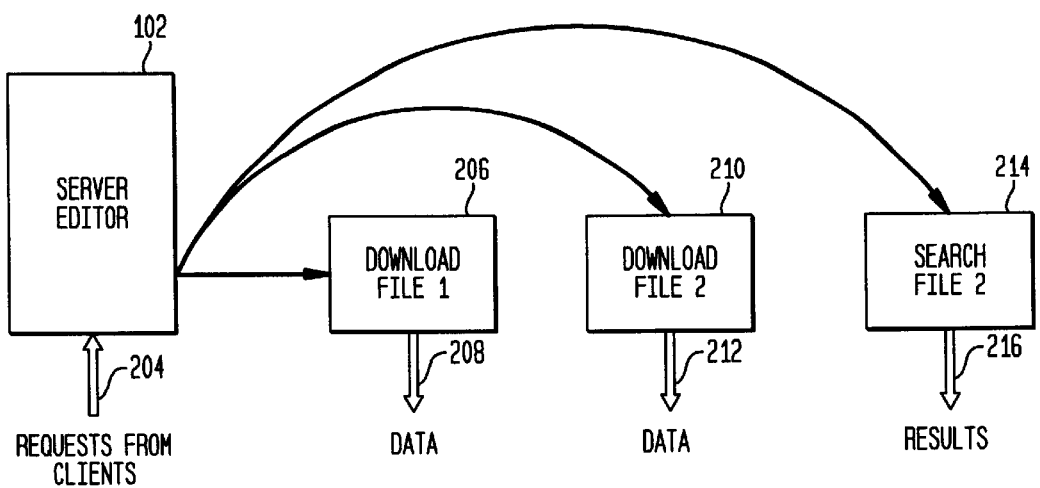
FIG. 2 is a diagram illustrating an example of the server component structure in the second embodiment of the present invention.

FIG. 2 is a diagram illustrating an example of the server component structure in the second embodiment of the present invention. In this embodiment, the server 102 generates an additional thread, e.g., threads 204, 206, 208 for each edit request received from the client. Each additional thread processes the task it was created to handle, communicates its response directly to the client as shown at 208, 212, 216 and, exits itself. For example, when the server 102 receives a request for an edit session with file 1, the server 102 generates the first download thread 206 to transmit data in file 1 to the client as shown at 208.

Similarly, when the server 102 receives a request for an edit session with file 2, the server 102 generates the second download thread 210 to transmit data in file 2 to the client as shown at 212. When another request is received by the server 102, the server 102 generates yet another thread to handle that request. For example, that request may be a search request to find occurrences of one or more words in file 2. In response to the search request received, the server 102 generates the search thread 214 to handle the search and transmit the results to the client as shown at 216.

As described with reference to FIG. 1, the search results may include pages of file 2 which have not yet been transferred to the client by the second download thread 210.

In one embodiment of the present invention, the search thread 214 may notify the second download thread 210 to skip downloading those pages which the search thread 214 has already downloaded as a result of a search task to eliminate redundant downloading. When each thread has completed its task for which it was created to perform, the thread cleans up itself and exits by, for example, invoking an "exit" operating system service call.

Figure 3:
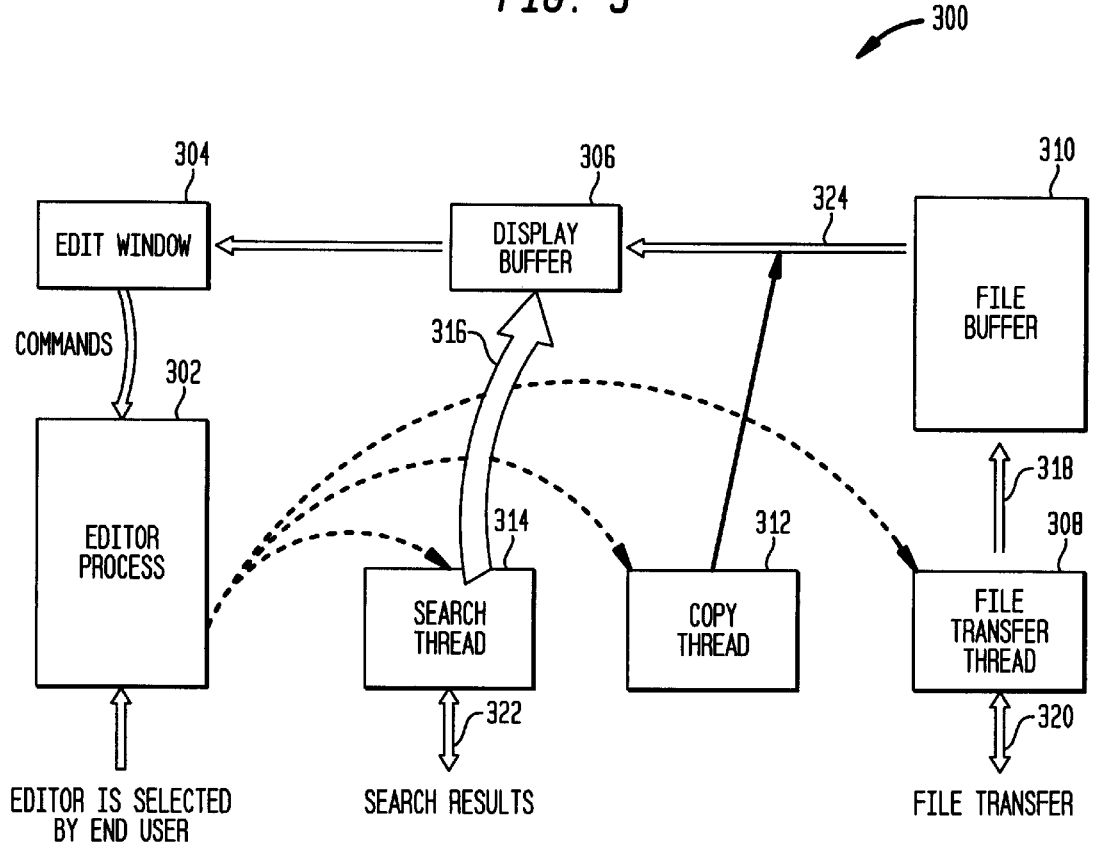
FIG. 3 is a diagram illustrating an example of the client component structure of the present invention.

FIG. 3 is a diagram 300 illustrating an example of the client component (client) structure of the present invention. When a user starts the client/server editor of the present invention on a workstation, a process for the editor, i.e., an editor process 302 is created and the edit window 304 is opened. The edit window 304 includes the displayed contents of a file for the user to edit. As part of this processing a display buffer 306 is created. The display buffer 306 is initially empty. The editor process 302 creates a first client thread 308 to communicate to the server component of the editor 102 to download, i.e., to transfer the file. Such communications may be established via operating systems calls including remote procedure calls and TCP/IP socket calls.

When the server component 102 responds to the client's request a file buffer 310 is created to hold the entire file. The size of the file buffer 310 is created to correspond to the size of the file. A second client thread 312 is created to copy data from the file buffer 310 into the display buffer 306 until the display buffer 306 is full. The display buffer 306 is presented to the user for editing. Once the display buffer 306 is presented, the end user may enter commands on the edit window 304, even though the entire file may not have been transmitted.

For each command that is entered, a new thread is created to communicate with the server component 102 or 106 for processing. An example of a command is a request for a search to find occurrences of one or more words in the file. A search thread 314 is created to send the search request to the server 102 or 106, and wait for the server's reply. When the search thread 314 receives the search results 322, the data representing the search results is copied as shown at 316 into the display buffer 306 and presented to the end user on the edit window 304. When the file transfer as shown at 318 and 329 is complete, the search thread 314 uses the local file buffer 310 instead of sending a request to the server 102 or 106.

Another example of an edit command is a request to go to or display a certain page of the file. For example, if a user presses an end function key on a keyboard to display the last page of the file, and the file transfer as shown at 318 and 320 is not complete, another thread (not shown) is created to request that the server 102/106 send data in the last page of file. This data is then copied into the display buffer 306, which is presented to the user on the edit window 304.

Similarly, when the user presses a down or up key to page through the file, and that page has not yet started to be transferred, yet another client thread is created to request the server 102/106 to retrieve the required page.

In another embodiment, edit requests for a result from the server 102/106 need not stop with one returned result. That is, in the above described example, as soon as the page requested is received from the server 102/106 and displayed, retrieval for pages near that page displayed may begin in anticipation of user's request to page up or down from the page displayed. The reasoning is that users typically navigate around a current page when editing a file. The retrieval for nearby pages may be initiated by a another new thread created by the client 302 or by the same thread that displayed the page request and that thread establishing a communications link with an appropriate server thread to download the nearby pages.

Another example of continued processing in anticipation of user's next request may occur with the processing of a search request as described hereinabove. After a first search is performed on the server and a result returned to the client, searching for next occurrences of the same search word or phrase may automatically begin. The results are again downloaded to the client so that when a user requests to search for a next occurrence, the client would have the results ready without having to make the request to the appropriate server thread.

Figure 4:
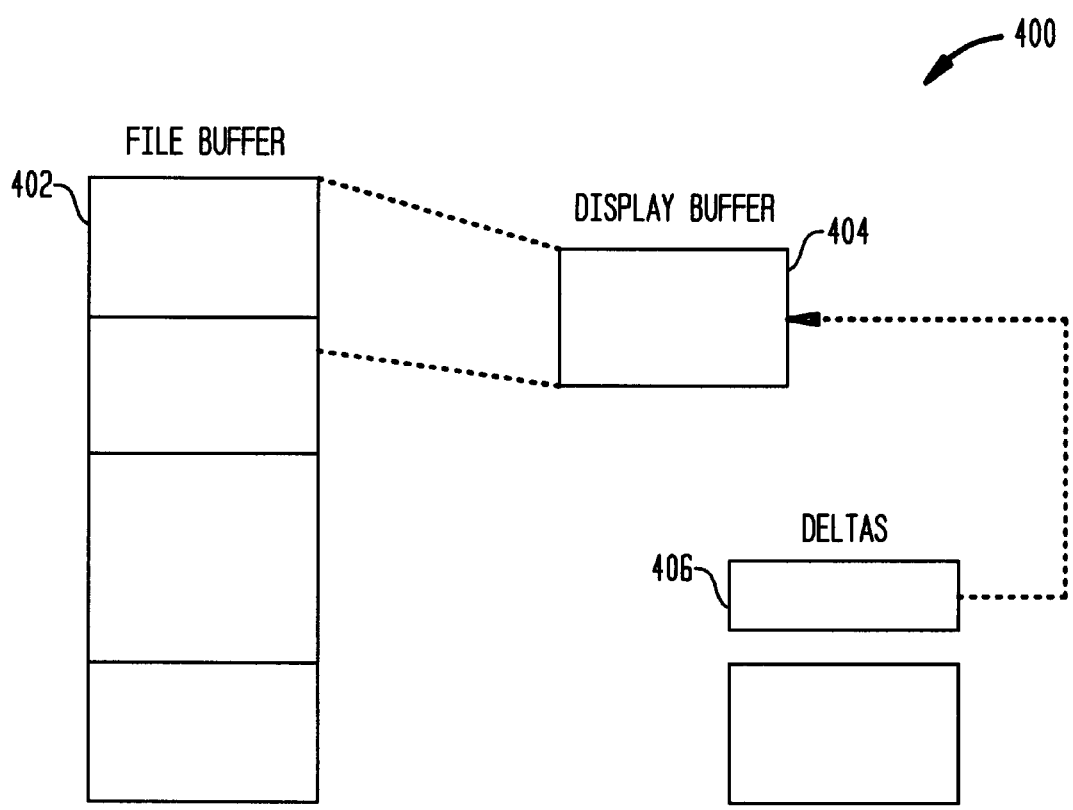
FIG. 4 is a diagram illustrating an example of the buffer structure of the present invention.

In one embodiment, the present invention includes generally with the client component 302, a number of buffers to store data related to the file being edited (edit file). FIG. 4 is diagram illustrating a buffer structure 400 of the present invention in one embodiment.

The file buffer 402 is employed to hold the edit file as the file or more specifically, the data in the file is downloading from the server when an edit session begins. At the same time the file downloading into the file buffer 402 begins, the contents of the file buffer 402 are transferred into the display buffer 404. When the display buffer 404 holds enough data, e.g., typically the size of a page on a display terminal, the contents of the display buffer 404 is displayed. Thus, displaying of a first page typically occurs before the entire file is downloaded from the server, thus, enabling a user to begin editing the file. The process of editing was described hereinabove with references to FIGS. 1, 2, and 3.

In one embodiment, the present invention also includes a delta buffer 406. When a user makes updates such as insertions, deletions, and/or any other form of changes to the edit file, a delta buffer 406 is created to hold those insertions, deletions, and/or any other form of changes. Deltas, e.g., insertions, deletions and/or other changes to the edit file, are applied to create the display buffer 404. The deltas are sent to the server when the user selects "save" option on the editor so that the server may update the file in its location. The deltas may also be sent as they are completed. Deltas are determined to be "complete" when the cursor is manually moved or a specified amount of data has been entered. In cases where the completed deltas without user's "save" request is sent to the server, the server does not update the file until a "save" command is received.

To save time and thereby improve performance of future edit sessions, the file is saved locally with the client as well as on the server. The name of the server from where the file was downloaded, and the directory path of the file in that server are stored along with the file itself. To ensure that users are working with the latest information, but at the same time to minimize the data transferred over a link between the client and the server, the next time the edit session is started, if this file had been previously saved locally, a test comparing the locally saved and the server located files is performed. Such a test may include determining whether the date/time stamp and size of the locally saved and the server located files are the same. If the files are identical, the file is not downloaded again and the locally saved file is used for the edit session; otherwise the file is downloaded according to the method of the present invention as described hereinabove. For example, if the deltas on the server are minimal or less than a predetermined size, only the deltas are downloaded from the server. The downloaded deltas are then combined with the version of the file already in the file buffer, which combination is presented to the user as the latest updated file. However, if it is determined that the size of the deltas stored in the server is relatively large and that the time and amount of processing required to download and combine the deltas with the contents of the file buffer in the client computer is greater than the processing required to download the whole file from the server, the whole file is downloaded and the file buffer is updated with this file.

In one embodiment, to control the local storage capacity, the number of locally saved files is predetermined not to exceed the predetermined number. Similarly, the size of a file which can be saved locally may be predetermined also. For example, if a size of a particular edit file is greater than a predetermined size, that file is not saved locally. Alternatively, a part of the file may be saved locally. Other criteria may be employed for saving files locally. Moreover, the locally saved file may have an expiration date on which the local file is deleted.

While the invention has been particularly shown and described with respect to a preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. A method of editing a data file with improved performance, the method comprising:
   transferring file data from a server to a client computer into a first location on the client computer;
   copying the file data from the first location to a second location on the client computer as the transferring step occurs;
   presenting the copied file data in the second location on a presentation device for editing; and,
   saving the file data in a permanent location at the client computer, wherein for subsequent requests for said data file, the method further comprises:
   determining whether the file data in the permanent location is different from the file data located at the server computer; and
   transferring the file data located at the server computer into the first location, if the file data in the permanent location is different from the file data located at the server computer.

2. The method of editing as claimed in claim 1, wherein the step of presenting is performed concurrently with the step of transferring.

3. The method of editing as claimed in claim 1, wherein the method further includes:
   retrieving a selected portion of the file data from the server into the second location concurrently with the step of transferring.

4. The method of editing as claimed in claim 3, wherein the step of retrieving is performed as a result of a request from the client for the selected portion.

5. The method of editing as claimed in claim 3, wherein the method further includes:
   retrieving automatically additional portions of the file data associated with the selected portion from the server into the second location.

6. The method as claimed in claim 1, wherein the method further includes:
   transmitting edit changes made to the file data to the server.

7. The method as claimed in claim 6, wherein the method further includes:

transmitting edit changes made to the file data to the server as bandwidth on a connection between the client computer and the server computer becomes available.

8. The method as claimed in claim 1, wherein the step of determining includes comparing sizes of the file data in the permanent location and the file data located at the server computer.

9. The method as claimed in claim 1, wherein the step of determining includes comparing last modification dates the file data in the permanent location and the file data located at the server computer.

10. The method as claimed in claim 1, wherein the step of transferring includes:

transferring from the server computer only updated portions which are different from the file data in the permanent location; and applying the updated transferred portions to the file data located in the permanent location.

11. A program storage device readable by machine, tangibly embodying a program of instructions executable by the machine to perform the method steps of editing a data file with improved performance, the method steps comprising:

transferring file data from a server to a client computer into a first location on the client computer;

copying the file data from the first location to a second location on the client computer as the transferring step occurs; and presenting the copied file data in the second location on a presentation device for editing; and, saving the file data in a permanent location at the client computer, wherein for subsequent requests for said data file, the method steps further comprising:

determining whether the file data in the permanent location is different from the file data located at the server computer; and transferring the file data located at the server computer into the first location, if the file data in the permanent location is different from the file data located at the server computer.

12. The program storage device as claimed in claim 11, wherein the method step of presenting is performed concurrently with the step of transferring.

13. The program storage device as claimed in claim 11, wherein the method steps further include:

retrieving a selected portion of the file data from the server into the second location concurrently with the step of transferring.

\* \* \* \* \*